United States Patent
Davis

(10) Patent No.: US 11,680,542 B2
(45) Date of Patent: Jun. 20, 2023

(54) THRUST REVERSER DOOR AND METHOD FOR MAKING SAME

(71) Applicant: Rohr, Inc., Chula Vista, CA (US)

(72) Inventor: Jennifer Davis, La Jolla, CA (US)

(73) Assignee: Rohr, Inc., Chula Vista, CA (US)

( * ) Notice: Subject to any disclaimer, the term of this patent is extended or adjusted under 35 U.S.C. 154(b) by 89 days.

(21) Appl. No.: 16/780,277

(22) Filed: Feb. 3, 2020

(65) Prior Publication Data

US 2021/0239073 A1 Aug. 5, 2021

(51) Int. Cl.
*F02K 1/70* (2006.01)
*F02K 1/72* (2006.01)

(52) U.S. Cl.
CPC .......... *F02K 1/70* (2013.01); *F05D 2220/323* (2013.01); *F05D 2230/232* (2013.01); *F05D 2250/28* (2013.01); *F05D 2260/30* (2013.01); *F05D 2300/702* (2013.01)

(58) Field of Classification Search
CPC ..... F02K 1/70; F02K 1/72; F02K 1/62; F02K 1/60; F02K 1/605; F02K 1/625; F02K 1/827; F05D 2230/232; F05D 2250/28; F05D 2260/30; F05D 2260/962; B32B 3/06; B32B 3/266; B32B 3/12
See application file for complete search history.

(56) References Cited

U.S. PATENT DOCUMENTS

| | | | | |
|---|---|---|---|---|
| 3,481,427 A * | 12/1969 | Dobbs | ............ | F02K 1/827 181/292 |
| 3,940,891 A * | 3/1976 | Slysh | ............ | B64G 99/00 428/116 |
| 4,012,549 A * | 3/1977 | Slysh | ............ | E04C 2/38 52/630 |
| 5,041,323 A * | 8/1991 | Rose | ............ | B32B 3/266 428/116 |
| 5,575,147 A * | 11/1996 | Nikkanen | ............ | F02K 1/625 239/265.29 |
| 8,763,753 B2 * | 7/2014 | Kray | ............ | F02C 7/24 181/292 |
| 9,845,769 B2 | 12/2017 | Hercock | | |
| 10,406,729 B2 | 9/2019 | Gaw | | |
| 2008/0083210 A1 | 4/2008 | Sternberger | | |
| 2009/0121078 A1 * | 5/2009 | Marche | ............ | B64D 33/04 244/11 OB |
| 2013/0251510 A1 * | 9/2013 | Runyan | ............ | F02K 1/827 415/119 |
| 2015/0336621 A1 * | 11/2015 | Godon | ............ | E04C 3/29 156/245 |
| 2016/0326985 A1 * | 11/2016 | Hercock | ............ | F02K 1/625 |
| 2017/0022903 A1 * | 1/2017 | Nesbitt | ............ | B64C 1/40 |
| 2018/0058373 A1 * | 3/2018 | Gaw | ............ | B29C 65/48 |
| 2018/0148187 A1 * | 5/2018 | Valleroy | ............ | G10K 11/168 |

(Continued)

OTHER PUBLICATIONS

EP search report for EP21154409.3 dated Jun. 9, 2021.

*Primary Examiner* — Andrew H Nguyen

(74) *Attorney, Agent, or Firm* — Getz Balich LLC

(57) ABSTRACT

A thrust reverser door includes a backskin including an interior surface and an exterior loft surface. The thrust reverser door further includes a cover plate including a cover plate body having a first side and a second side opposite the first side. The thrust reverser door further includes a grid structure mounted to the second side of the cover plate body and the interior surface of the backskin.

14 Claims, 10 Drawing Sheets

(56) References Cited

U.S. PATENT DOCUMENTS

| | | | |
|---|---|---|---|
| 2018/0218723 A1* | 8/2018 | Lin | ............... B32B 3/266 |
| 2019/0061276 A1* | 2/2019 | Gurney | ............ B32B 27/08 |
| 2019/0264614 A1 | 8/2019 | Versaevel | |
| 2019/0285028 A1 | 9/2019 | Shetty | |
| 2019/0301370 A1* | 10/2019 | Joshi | ............... E04B 1/82 |

* cited by examiner

THRUST REVERSER DOOR AND METHOD FOR MAKING SAME

BACKGROUND

1. Technical Field

This disclosure relates generally to thrust reversers for gas turbine engines, and more particularly to thrust reverser doors.

2. Background Information

Modern aircraft gas turbine engines may include thrust reversers configured to improve the braking ability of an aircraft by redirecting forward at least a part of the thrust generated by the gas turbine engine. The thrust reverser may include one or more doors configured to pivot from a stowed position to a deployed position so as to redirect gas turbine engine bypass air flow as well as to create additional drag on the exterior of the gas turbine engine.

Thrust reverser doors are complex parts that may require high stiffness, complex curvatures, and the ability to transfer load across the door. However, conventional methods of manufacturing suitable thrust reverser doors can be time consuming and expensive. Accordingly, what is needed are improved thrust reverser doors and methods of manufacturing which address one or more of the above-discussed concerns.

SUMMARY

It should be understood that any or all of the features or embodiments described herein can be used or combined in any combination with each and every other feature or embodiment described herein unless expressly noted otherwise.

According to an embodiment of the present disclosure, a thrust reverser door includes a backskin including an interior surface and an exterior loft surface. The thrust reverser door further includes a cover plate including a cover plate body having a first side and a second side opposite the first side. The thrust reverser door further includes a grid structure mounted to the second side of the cover plate body and the interior surface of the backskin.

In the alternative or additionally thereto, in the foregoing embodiment, the grid structure has an orthogrid configuration.

In the alternative or additionally thereto, in the foregoing embodiment, the grid structure has an isogrid configuration.

In the alternative or additionally thereto, in the foregoing embodiment, the grid structure is formed on the second side of the cover plate body. The grid structure has a first grid side in contact with the second side of the cover plate body and a second grid side opposite the first grid side. The second grid side of the grid structure has a shape conforming to a corresponding shape of the interior surface of the backskin.

In the alternative or additionally thereto, in the foregoing embodiment, the grid structure is formed on the interior surface of the backskin. The grid structure has a first grid side in contact with the interior surface of the backskin and a second grid side opposite the first grid side. The second grid side of the grid structure has a shape conforming to a corresponding shape of the second side of the cover plate body.

In the alternative or additionally thereto, in the foregoing embodiment, the cover plate body and the backskin include a thermoplastic material.

In the alternative or additionally thereto, in the foregoing embodiment, the grid structure is welded to the backskin.

In the alternative or additionally thereto, in the foregoing embodiment, the cover plate is fastened to the backskin with a plurality of fasteners.

In the alternative or additionally thereto, in the foregoing embodiment, the grid structure includes a plurality of nodes and the grid structure is mounted to the interior surface of the backskin at the plurality of nodes.

According to another embodiment of the present disclosure, a method for forming a thrust reverser door includes providing a backskin including an interior surface and an exterior loft surface. The method further includes forming a cover plate body of a cover plate. The cover plate body includes a first side and a second side opposite the first side. The method further includes forming a grid structure. The method further includes mounting the second side of the cover plate body to the interior surface of the backskin with the grid structure.

In the alternative or additionally thereto, in the foregoing embodiment, forming the grid structure includes forming the grid structure independent of the cover plate body and the backskin.

In the alternative or additionally thereto, in the foregoing embodiment, the grid structure has an orthogrid configuration.

In the alternative or additionally thereto, in the foregoing embodiment, the grid structure has an isogrid configuration.

In the alternative or additionally thereto, in the foregoing embodiment, forming the grid structure further includes overmolding the grid structure onto the second side of the cover plate body and forming the grid structure to conform to the interior surface of the backskin.

In the alternative or additionally thereto, in the foregoing embodiment, the cover plate body and the backskin include a thermoplastic material.

In the alternative or additionally thereto, in the foregoing embodiment, mounting the second side of the cover plate body to the interior surface of the backskin with the grid structure includes induction welding the grid structure to one or both of the cover plate body and the backskin.

In the alternative or additionally thereto, in the foregoing embodiment, overmolding the grid structure onto the second side of the cover plate body includes forming a plurality of nodes.

In the alternative or additionally thereto, in the foregoing embodiment, mounting the second side of the cover plate body to the interior surface of the backskin with the grid structure includes mounting the grid structure to the interior surface of the backskin at the plurality of nodes.

In the alternative or additionally thereto, in the foregoing embodiment, the method further includes, subsequent to overmolding the grid structure onto the second side of the cover plate body, overmolding a plurality of fasteners to respective nodes of the plurality of nodes.

According to another embodiment of the present disclosure, a gas turbine engine includes a nacelle and a thrust reverser forming a portion of the nacelle. The thrust reverser includes at least one thrust reverser door pivotably mounted to the nacelle and configured to pivot between a stowed position and a deployed position. The at least one thrust reverser door includes a backskin including an interior surface and an exterior loft surface. The exterior loft surface of the backskin is configured to form a portion of an outer surface of the nacelle with the thrust reverser door in the stowed position. The at least one thrust reverser door further includes a cover plate including a cover plate body having a first side and a second side opposite the first side. The cover plate further includes a grid structure having an orthogrid configuration. The grid structure extends from the second side of the cover plate body. The grid structure is welded to the interior surface of the backskin.

The present disclosure, and all its aspects, embodiments and advantages associated therewith will become more readily apparent in view of the detailed description provided below, including the accompanying drawings.

DETAILED DESCRIPTION

Figure 1:
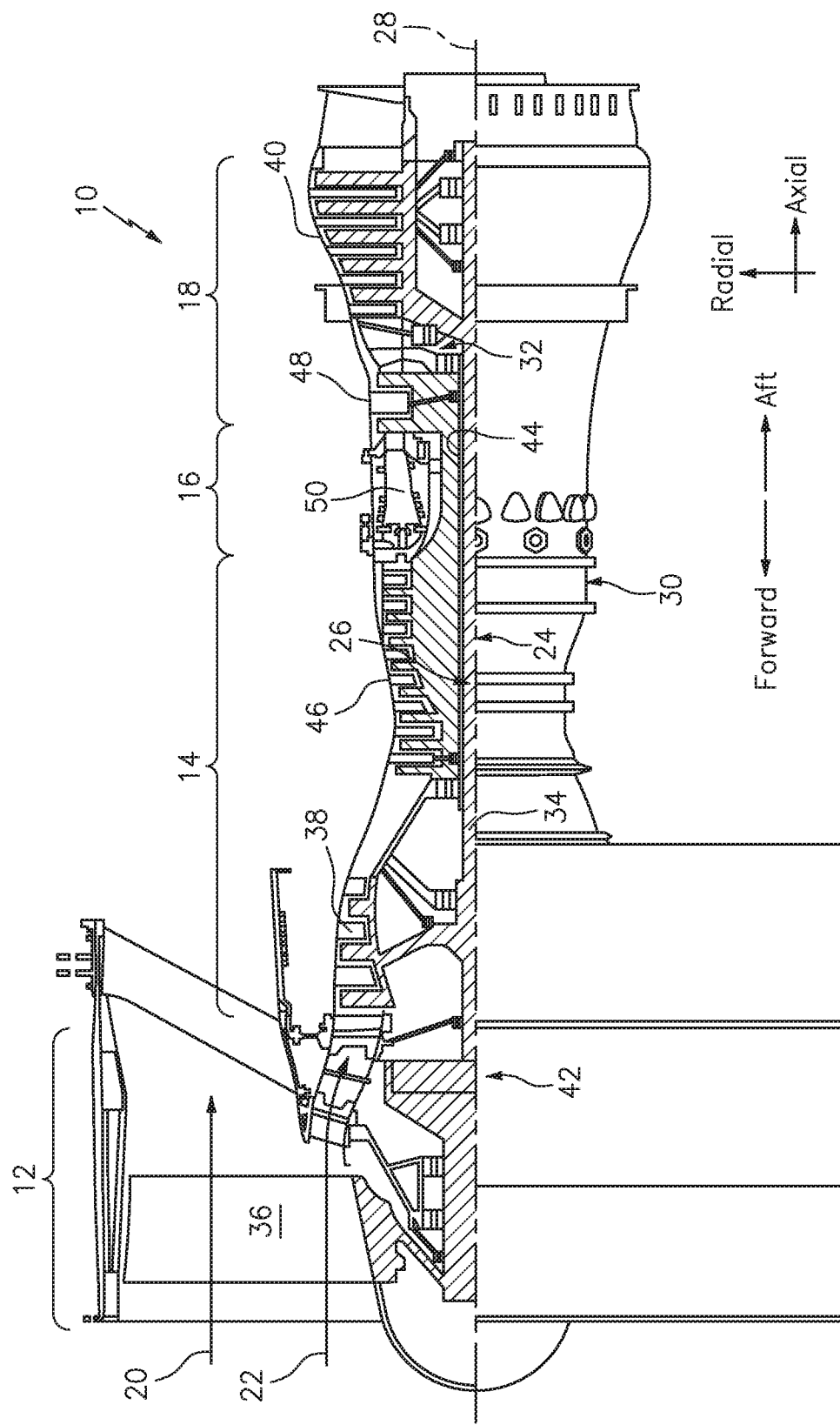
FIG. 1 illustrates a side cross-sectional view of a gas turbine engine in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1, an exemplary gas turbine engine 10 is schematically illustrated. The gas turbine engine 10 is disclosed herein as a two-spool turbofan engine that generally includes a fan section 12, a compressor section 14, a combustor section 16, and a turbine section 18. The fan section 12 drives air along a bypass flow path 20 while the compressor section 14 drives air along a core flow path 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those with three-spool architectures.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 may be connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44.

Airflow along the core flow path 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low-pressure spool 24 and the high-pressure spool 26, respectively, in response to the expansion.

Figures 2A, 2B:
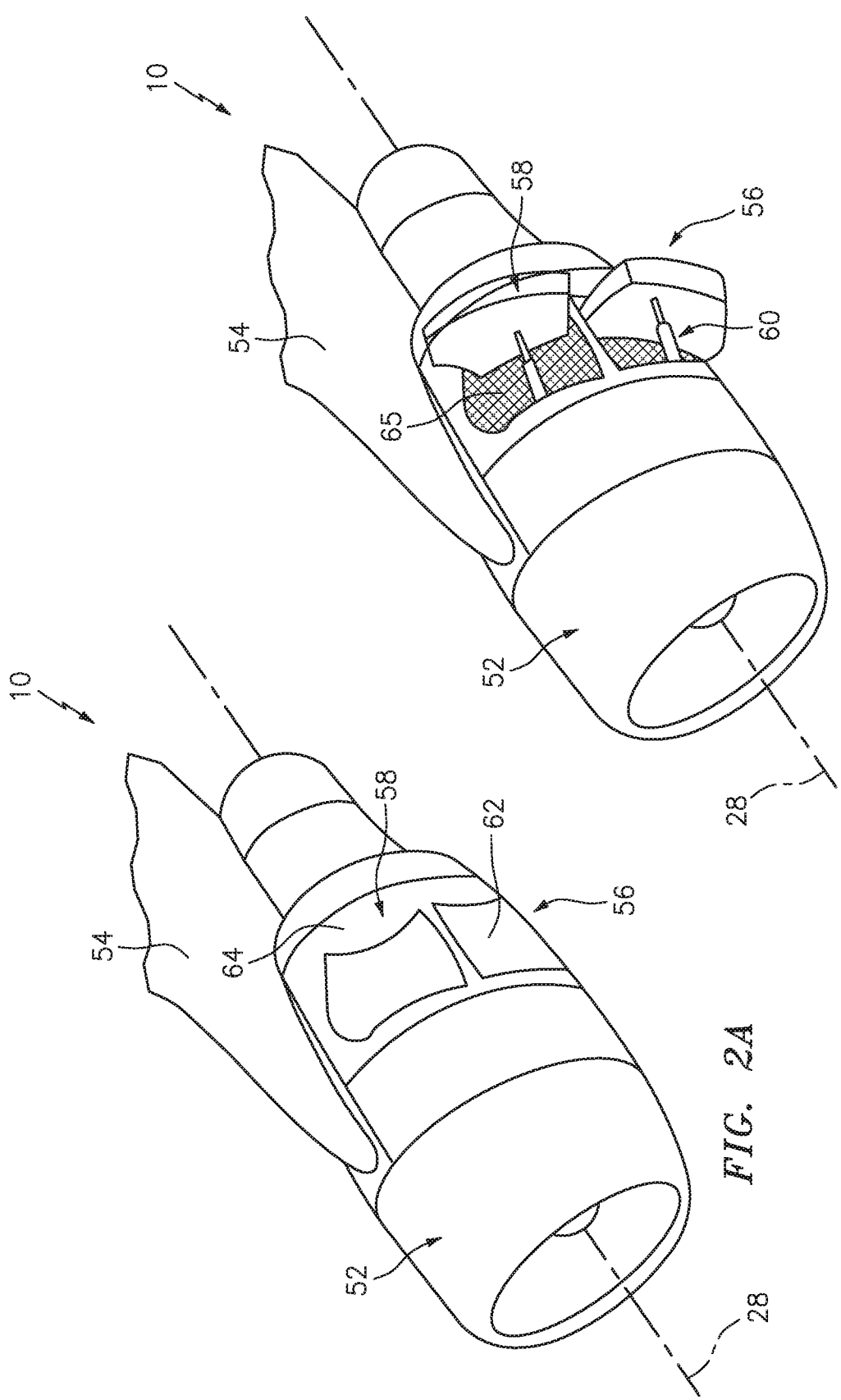
FIG. 2A illustrates a perspective view of a gas turbine engine in accordance with one or more embodiments of the present disclosure.
FIG. 2B illustrates a perspective view of a gas turbine engine in accordance with one or more embodiments of the present disclosure.
Figure 3:
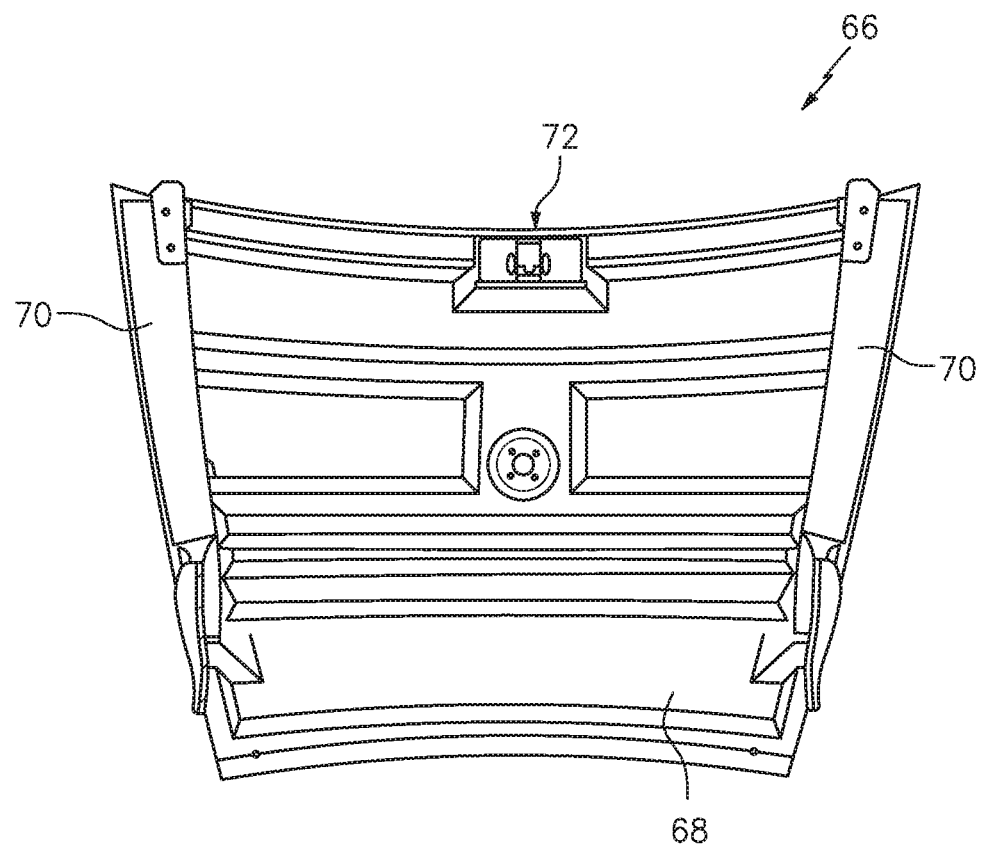
FIG. 3 illustrates a side view of an interior of a thrust reverser door backskin in accordance with one or more embodiments of the present disclosure.
Figure 4:
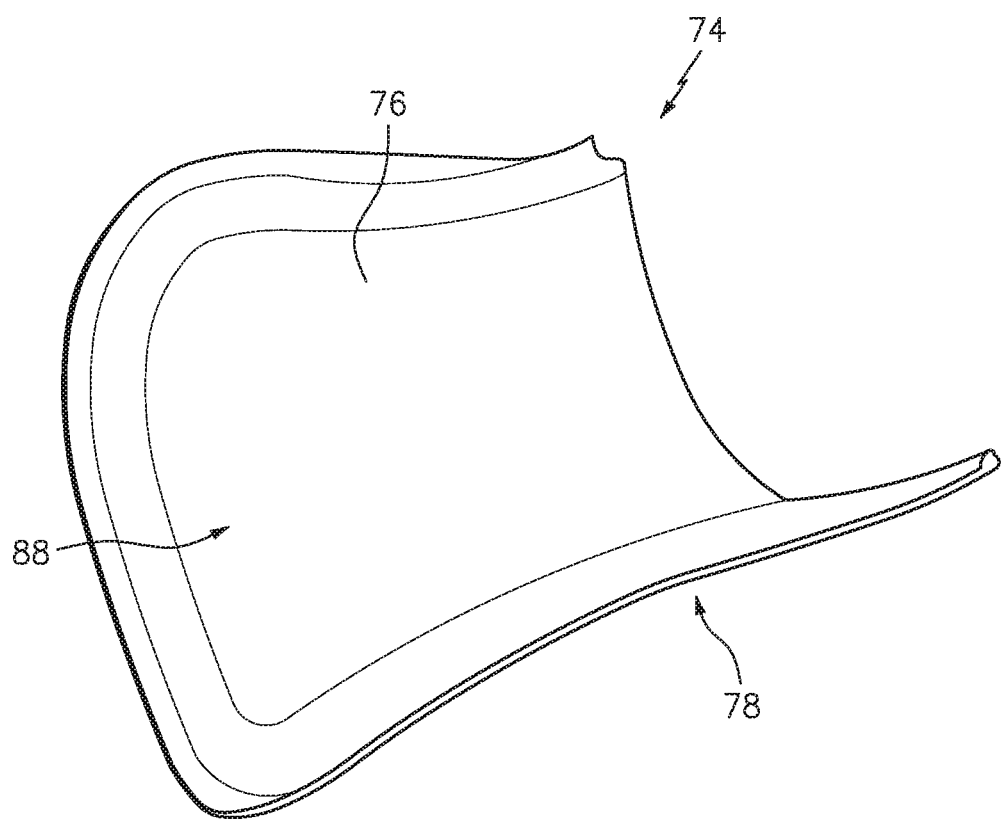
FIG. 4 illustrates a perspective view of a thrust reverser door cover plate in accordance with one or more embodiments of the present disclosure.

Referring to FIGS. 1, 2A, and 2B, the gas turbine engine 10 includes a nacelle 52 generally enclosing and forming an exterior housing of the gas turbine engine 10. The nacelle 52 of the gas turbine engine 10 is mounted to a pylon 54, which may, for example, mount the gas turbine engine 10 to a wing of an aircraft (not shown). The nacelle 52 may include a thrust reverser assembly 56 forming an aft portion of the nacelle 52. The thrust reverser assembly 56 includes a plurality of doors 58 and a respective plurality of actuators 60. Each door 58 may be pivotably mounted to the nacelle 52 and configured to pivot between a stowed position (see, e.g., FIG. 2A) and a deployed position (see, e.g., FIG. 2B).

In the stowed position, an exterior loft surface 62 of the door 58 may be configured to form a portion of an outer surface 64 of the nacelle 52. As used herein, terms such as "forward" and "aft" should be understood as positional terms in reference to the direction of airflow, such as airflow along the bypass flow path 20, through the nacelle 52.

In operation, each door 58 may be pivoted by a respective actuator 60 between the stowed position and the deployed position. When pivoted to the deployed position, the door 58 may reduce aircraft braking requirements and permit the use of shorter runways by reversing a substantial portion of engine thrust during landing. The thrust reverser assembly 56 may slow down the aircraft by preventing the gas turbine engine 10 from generating forward fan thrust and by generating reverse thrust to counteract primary thrust. For example, in the deployed position, the plurality of doors 58 may block all or a portion of the bypass flow path 20, enclosed by the nacelle 52, and direct the airflow of the bypass flow path 20 in a forward direction through recesses 65 within which the plurality of doors 58 are retained when in the stowed position. The door 58, in the deployed position, may further contribute to slowing the aircraft by creating additional drag.

Referring to FIGS. 3-6, the door 58 includes a backskin 66 having an interior surface 68 and the exterior loft surface 62 opposite the interior surface 68. The backskin 66 may be a single-piece component formed of, for example, a thermoplastic material, a thermoset material, or any other suitable lightweight material such as aluminum. The backskin 66 may be pivotably mounted to the nacelle 52 by one or more hinges 70 and may be coupled to the actuator 60 at an actuator attachment point 72.

The door 58 includes a cover plate 74 comprising a cover plate body 88 having a first side 76, which defines an inner loft surface of the door 58, and a second side 78 opposite the first side 76. The door 58 further includes a grid structure 80 mounting the second side 78 of the cover plate to the interior surface 68 of the backskin 66. In various embodiments, the grid structure 80 may be formed (e.g., overmolded or compression molded) on the cover plate 74 and may extend from the second side 78 of the cover plate body 88. In various other embodiments, the grid structure 80 may be formed on the backskin 66 and may extend from the interior surface 68 of the backskin 66. The grid structure 80 is defined by a plurality of intersecting ribs 82. In various embodiments, the plurality of ribs 82 may be arranged such that the grid structure 80 has an orthogrid configuration (see, e.g., FIGS. 5A and 5C). In various embodiments, the plurality of ribs 82 may be arranged such that the grid structure 80 has an isogrid configuration (see, e.g., FIG. 5C).

In various embodiments, where the grid structure 80 is formed on the cover plate 74, the plurality of ribs 82 includes a first side 84 in contact with the second side 78 of the cover plate body 88 and a second side 86 mounted to the interior surface 68 of the backskin 66. Similarly, in various embodiments, where the grid structure 80 is formed on the backskin 66, the first side 84 of the plurality of ribs 82 is in contact with the interior surface 68 of the backskin 66 and the second side 86 of the plurality of ribs 82 is mounted to the second side 78 of the cover plate 74. In various embodiments, the second side 86 of the plurality of ribs 82 of the grid structure 80 may conform to the respective interior surface 68 of the backskin 66 or second side 78 of the cover plate 74. For example, the second side 86 of the plurality of ribs 82 may be shaped to conform to a corresponding shape of the interior surface 68. Accordingly, a height H of the plurality of ribs 82 between the first side 84 and the second side 86 may vary throughout the grid structure 80.

In various embodiments, the cover plate 74 may be formed from a thermoplastic material (e.g., polyether ether ketone (PEEK)). For example, the cover plate body 88 may be a stamped thermoplastic material with the grid structure 80 formed by overmolding a thermoplastic material onto the second side 78 of the cover plate body 88 or the interior surface 68 of the backskin 66. In various embodiments, a material (e.g., a thermoplastic or a thermoset material) of one or more of the cover plate 74, the grid structure 80, and the backskin 66 may include fibers for reinforcing the thermoplastic or thermoset material. For example, the thermoplastic or thermoset material may include continuous, discontinuous, or chopped carbon fibers.

Figure 5A:
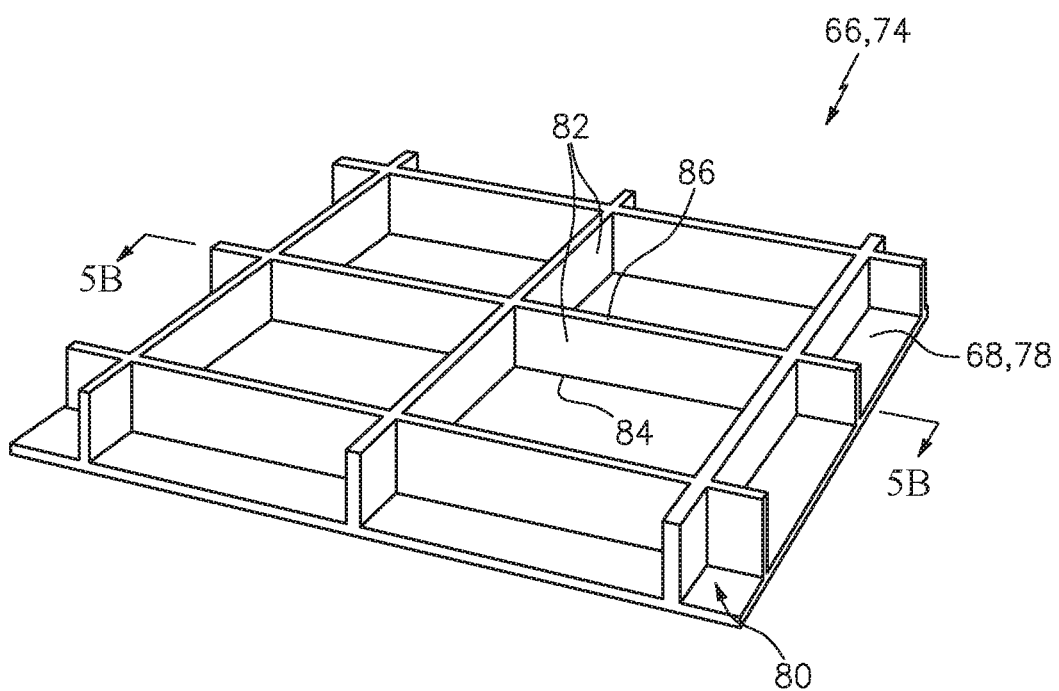
FIG. 5A illustrates a perspective view of a portion of a grid structure in accordance with one or more embodiments of the present disclosure.
Figure 5B:
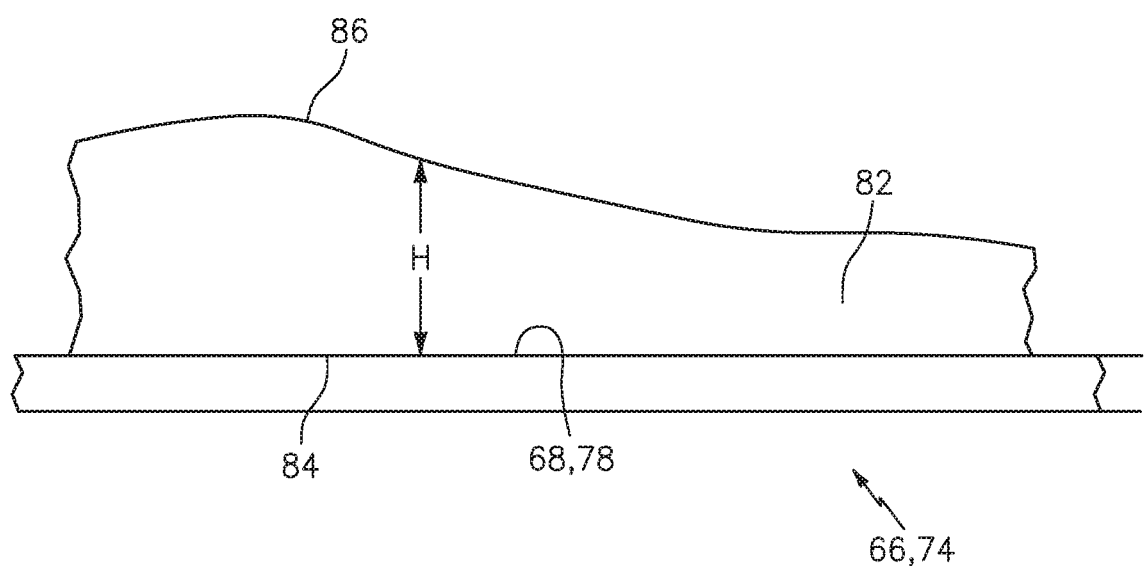
FIG. 5B illustrates a cross-sectional view of the portion of the grid structure of FIG. 5A, taken along line 5B-5B, in accordance with one or more embodiments of the present disclosure.
Figure 5C:
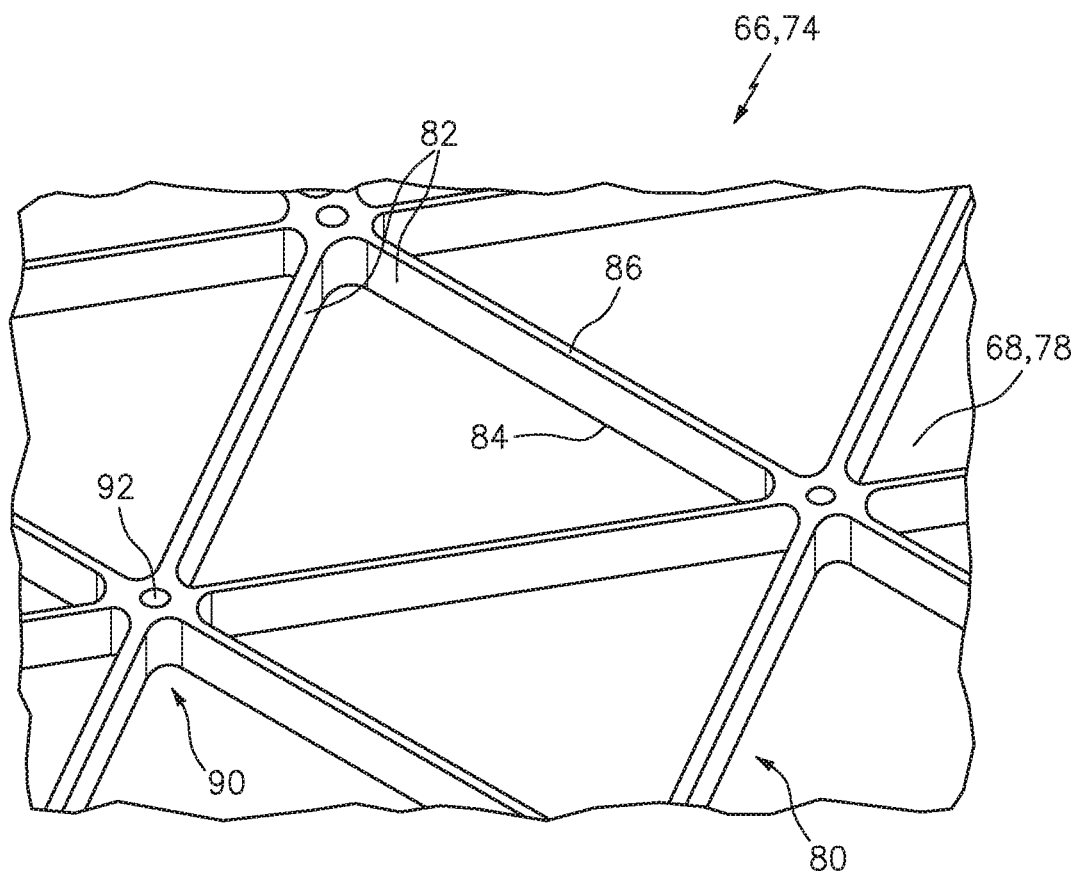
FIG. 5C illustrates a perspective view of a portion of a grid structure in accordance with one or more embodiments of the present disclosure.
Figure 5D:
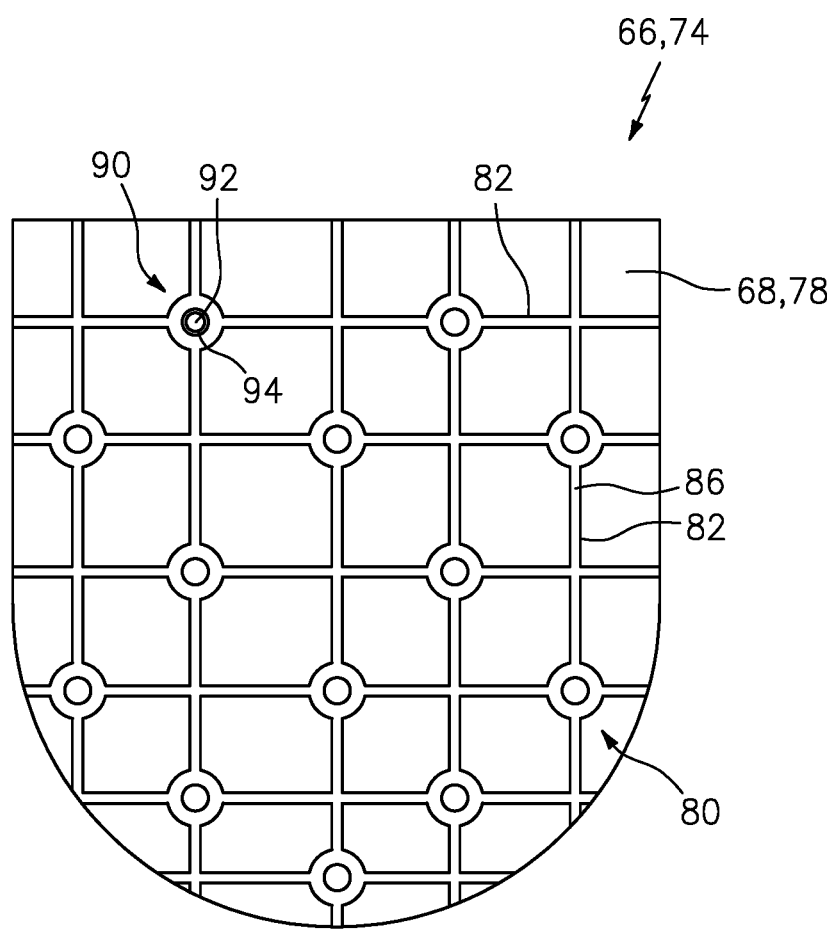
FIG. 5D illustrates a view of a portion of a grid structure in accordance with one or more embodiments of the present disclosure.
Figure 6:
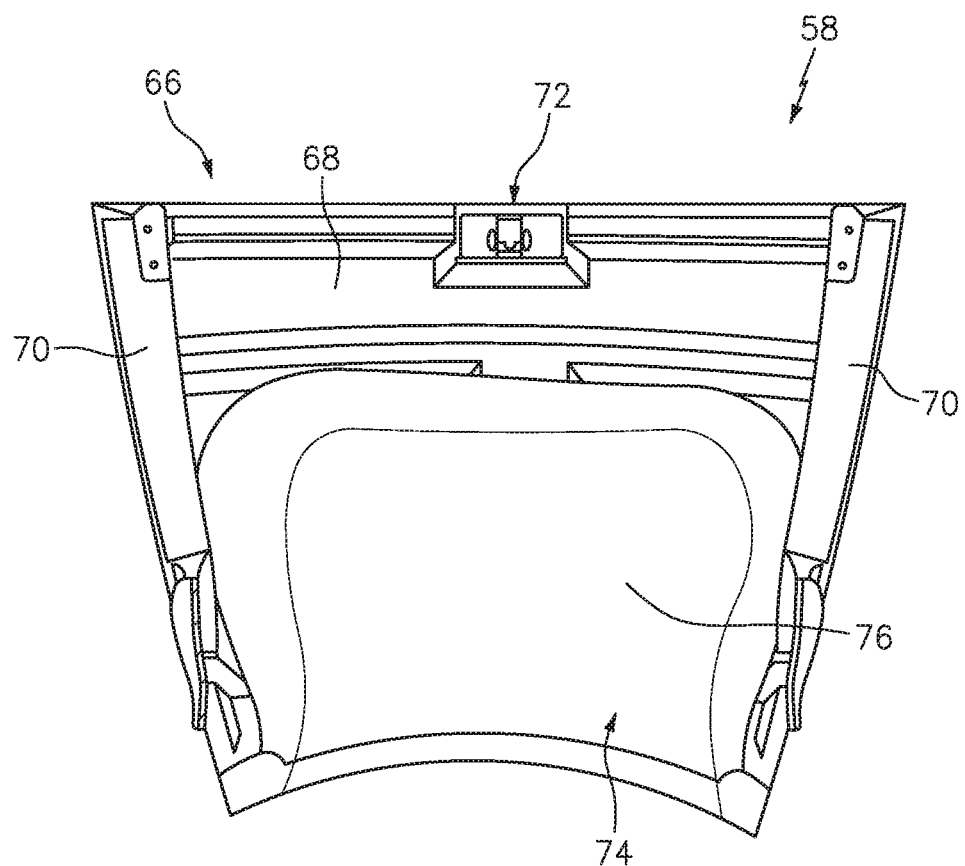
FIG. 6 illustrates a side view of a thrust reverser door in accordance with one or more embodiments of the present disclosure.
Figure 7:
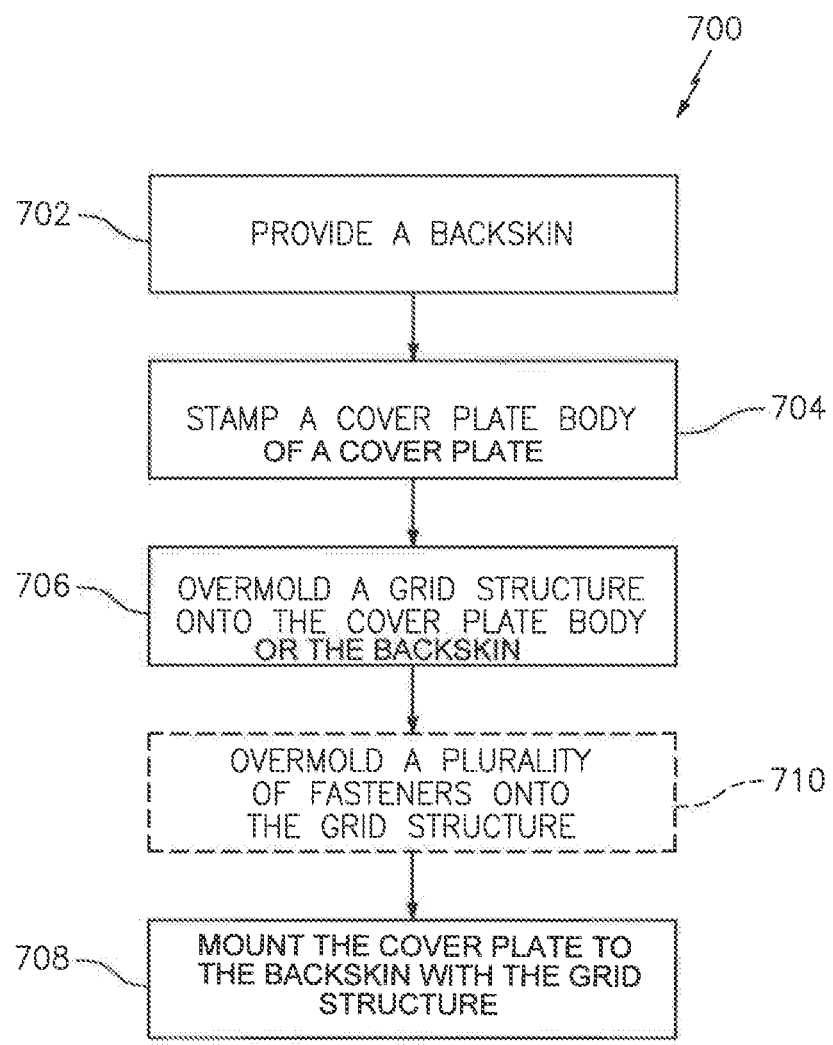
FIG. 7 illustrates a flow chart for a method for forming a thrust reverser door in accordance with one or more embodiments of the present disclosure.

In various embodiments, the grid structure 80 may include a plurality of nodes 90 formed at interfaces between intersecting ribs of the plurality of ribs 82 (see, e.g., FIGS. 5C and 5D). The grid structure 80 may be mounted to the interior surface 68 of the backskin 66 at the plurality of nodes 90. The plurality of nodes 90 may include a respective plurality of apertures 92 for the passage of fasteners 94 therethrough for mounting the cover plate 74 to the backskin 66.

Referring to FIGS. 3-7, a method 700 for forming a thrust reverser door, such as the door 58, is provided. In Step 702, the backskin 66 including the interior surface 68 and the exterior loft surface 62 is provided. In Step 704, the cover plate 74 is formed, for example, by stamping (e.g., with a heated press) or the cover plate 74 may be laid up with continuous fibers on a mold.

In Step 706, the grid structure 80 is formed. The grid structure 80 may be overmolded onto the second side 78 of the cover plate body 88. The grid structure 80 may be overmolded onto the second side 78 of the cover plate body 88 such that the second side 86 of the plurality of ribs 82 of the grid structure 80 conforms to the interior surface 68 of the backskin 66. In some embodiments, Step 706 include overmolding the grid structure 80 onto the second side 78 of the cover plate body 88 so as to include the plurality of nodes 90, as previously discussed. In various embodiments, the grid structure 80 may be formed (e.g., molded) independent of the cover plate 74 and the backskin 66 and may be mounted to the cover plate 74 and the backskin 66 subsequent to the formation of the grid structure 80 (see Step 708).

In Step 708, the grid structure 80 of the cover plate 74 is mounted to the interior surface 68 of the backskin 66. In various embodiments, mounting the grid structure 80 to the interior surface 68 may include welding the second side 86 of the plurality of ribs and/or the plurality of nodes 90 to the interior surface 68. For example, the grid structure 80 may be induction welded to the interior surface 68 of the backskin 66. Alternatively, in various embodiments, the grid structure 80 of the cover plate 74 may be bonded to the interior surface 68 of the backskin 66 with a suitable adhesive. Alternatively, in various embodiments, the grid structure 80 may be mounted to the interior surface 68 of the backskin 66 by the plurality of fasteners 94 extending through the plurality of apertures 92 of the plurality of nodes 90 or through alternative apertures disposed through the cover plate 74, for example, along a perimeter of the cover plate 74. While Steps 706 and 708 discuss overmolding the grid structure 80 onto the second side 78 of the cover plate body 88 and mounting the grid structure 80 to the interior surface 68 of the backskin 66, it should be understood that the grid structure 80 can be similarly formed (e.g., overmolded) onto the interior surface 68 of the backskin 66 and mounted to the second side 78 of the cover plate body 88.

In various embodiments, the method 700 may include in Step 710, subsequent to overmolding the grid structure 80 onto the second side 78 of the cover plate body 88, overmolding the plurality of fasteners 94 onto the grid structure 80 or the interior surface 68 of the backskin 66.

The cover plate 74 and backskin 66 of the present disclosure may provide a thrust reverser door, such as the door 58, having substantially improved stiffness while reducing manufacturing time and cost.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A nacelle comprising:
   a thrust reverser door comprising:
   a backskin comprising an interior surface with an actuator attachment point and an exterior loft surface defining an exterior nacelle surface;
   a cover plate comprising a cover plate body have a first side and a second side opposite the first side; and
   a grid structure formed on the second side of the cover plate body, the grid structure defined by a plurality of ribs;
   wherein the grid structure and the cover plate are spaced apart from the actuator attachment point; and
   wherein the grid structure comprises a plurality of nodes formed at interfaces between intersecting ribs of the plurality of ribs and wherein the grid structure is mounted to the interior surface of the backskin only at the plurality of nodes by at least one of:
   welding; or
   a fastening arrangement, the fastening arrangement comprising a subset plurality of nodes of the plurality of nodes, and each node of the subset plurality including a fastener aperture.

2. The nacelle of claim 1, wherein the grid structure has an orthogrid configuration.

3. The nacelle of claim 1, wherein the grid structure has an isogrid configuration.

4. The nacelle of claim 1, wherein the grid structure is formed on the second side of the cover plate body and wherein the grid structure has a first grid side in contact with the second side of the cover plate body and a second grid side opposite the first grid side, the second grid side of the grid structure having a shape conforming to a corresponding shape of the interior surface of the backskin.

5. The nacelle of claim 4, wherein a height of the plurality of ribs between the first grid side and the second grid side varies within the grid structure and wherein the second grid side includes a curved surface which conforms to the corresponding shape of the interior surface of the backskin.

6. The nacelle of claim 1, wherein the grid structure is formed on the interior surface of the backskin and wherein the grid structure has a first grid side in contact with the interior surface of the backskin and a second grid side opposite the first grid side, the second grid side of the grid structure having a shape conforming to a corresponding shape of the second side of the cover plate body.

7. The nacelle of claim 1, wherein the cover plate body and the backskin comprise a thermoplastic material.

8. The nacelle of claim 1, wherein the cover plate is fastened to the backskin with a plurality of fasteners only at the plurality of nodes.

9. The nacelle of claim 1, wherein the cover plate body is a thermoplastic cover plate body and the grid structure includes a thermoplastic material overmolded on the second side of the thermoplastic cover plate body.

10. The nacelle of claim 1, wherein the plurality of nodes includes the subset plurality of nodes, and each node of the subset plurality of nodes includes the fastener aperture.

11. The nacelle of claim 1, wherein the grid structure is welded to the interior surface of the backskin only at the plurality of nodes.

12. A nacelle comprising:
   a thrust reverser door comprising:
   a backskin comprising an interior surface with an actuator attachment point and an exterior loft surface defining an exterior nacelle surface;
   a cover plate comprising a thermoplastic cover plate body have a first side and a second side opposite the first side; and
   a thermoplastic grid structure overmolded on the second side of the thermoplastic cover plate body, the thermoplastic grid structure defined by a plurality of ribs, the grid structure including a plurality of nodes formed at interfaces between intersecting ribs of the plurality of ribs, the grid structure is mounted to the interior surface of the backskin at the plurality of nodes, the thermoplastic grid structure including a first grid side in contact with the second side of the thermoplastic cover plate body and a second grid side opposite the first grid side, a height of the plurality of ribs between the first grid side and the second grid side varying within the thermoplastic grid structure, the second grid side including a curved surface which conforms to the corresponding shape of the interior surface of the backskin,
   wherein the grid structure and the cover plate are spaced apart from the actuator attachment point; and
   wherein the plurality of nodes includes a subset plurality of nodes, and each node of the subset plurality of nodes includes a fastener aperture.

13. The nacelle of claim 12, wherein the backskin comprises aluminum.

14. A nacelle comprising:
   a thrust reverser door comprising:
   a backskin comprising an interior surface with an actuator attachment point and an exterior loft surface defining an exterior nacelle surface;

a cover plate comprising a cover plate body have a first side and a second side opposite the first side; and a grid structure formed on the second side of the cover plate body, the grid structure defined by a plurality of ribs;

wherein the grid structure comprises a plurality of nodes formed at interfaces between intersecting ribs of the plurality of ribs and wherein the grid structure is mounted to the interior surface of the backskin at the plurality of nodes; and wherein the grid structure and the cover plate are spaced apart from the actuator attachment point; and wherein the plurality of nodes includes a subset plurality of nodes, and each node of the subset plurality of nodes includes a fastener aperture.

* * * * *